United States Patent [19]

Kramer et al.

[11] Patent Number: 5,302,357

[45] Date of Patent: Apr. 12, 1994

[54] APPARATUS FOR AN ON-STREAM PARTICLE REPLACEMENT SYSTEM FOR COUNTERCURRENT CONTACT OF A GAS AND LIQUID FEED STREAM WITH A PACKED BED

[75] Inventors: David C. Kramer, San Anselmo; Bruce E. Stangeland, Berkeley, both of Calif.; David S. Smith; James T. McCall, both of Baton Rouge, La.; Georgieanna L. Scheuerman, Moraga; Robert W. Bachtel, El Cerrito, both of Calif.

[73] Assignee: Chevron Research and Technology Co., San Francisco, Calif.

[21] Appl. No.: 14,847

[22] Filed: Feb. 8, 1993

Related U.S. Application Data

[60] Continuation of Ser. No. 727,656, Jul. 9, 1991, abandoned, which is a division of Ser. No. 381,948, Jul. 19, 1989, Pat. No. 5,076,908.

[51] Int. Cl.$^5$ .............................................. B01J 8/08
[52] U.S. Cl. .................................. 422/219; 422/220; 422/311
[58] Field of Search ............... 422/141, 311, 143, 216, 422/219, 112, 110, 115, 295, 220; 208/148, 173, 171, 152, 163–165, 166, 157, 158

[56] References Cited

U.S. PATENT DOCUMENTS

| | | | |
|---|---|---|---|
| 3,336,217 | 2/1967 | Meaux | 208/143 |
| 3,470,090 | 9/1969 | Carson . | |
| 3,716,478 | 2/1973 | Kodera et al. . | |
| 3,730,880 | 5/1973 | Van Der Toorn et al. . | |
| 3,873,441 | 3/1975 | Jones | 208/166 |
| 4,167,474 | 9/1979 | Sikonia . | |
| 4,259,294 | 3/1981 | Van Zijii et al. . | |
| 4,312,741 | 1/1982 | Jacquin . | |
| 4,392,943 | 7/1983 | Euzen et al. . | |
| 4,444,653 | 4/1984 | Euzen et al. . | |
| 4,478,707 | 10/1984 | Bischoff et al . | |
| 4,540,547 | 9/1985 | Schuurman . | |
| 4,571,326 | 2/1986 | Bischoff et al. | 208/166 |
| 4,639,354 | 1/1987 | Bischoff et al. . | |
| 4,664,782 | 5/1987 | Gilliaso et al. . | |
| 4,968,409 | 11/1990 | Smith | 422/216 X |

Primary Examiner—Robert J. Warden
Assistant Examiner—Amalia Santiago
Attorney, Agent, or Firm—Burns, Doane, Swecker & Mathis

[57] ABSTRACT

On-stream catalyst replacement apparatus for countercurrent upstream flow of a gas and hydrocarbon liquid through a downward moving catalyst bed in a reactor vessel. A mixed feed stream of gas and liquid hydrocarbon components enters a reservoir formed between the lower end of the reactor and a conical screen supporting the lower end of a catalyst bed. A wall across the vessel divides the reservoir into a lower surge chamber for receiving the mixed feed and an upper plenum chamber for separating the components into alternate feed rings of gas and hydrocarbon liquid under the conical screen. The mixed feed enters the plenum chamber through a plurality of tubes extending downwardly from the wall to the same depth in the surge chamber that prevents establishing preferential paths for gas to independently enter the plenum chamber. Excessive separation of the gas and liquid components from the mixed feed in the plenum chamber is prevented by use of a plurality of concentric baffles abutting the underside of the conical screen and which are closely spaced apart only sufficient to create adjacent and alternate feed rings of gas and liquid. The depth of the lower end of each baffle is intermediate the depth of the two radially adjacent concentric baffles.

Catalyst is continuously or periodically added to, or removed from, the vessel through tubing and a full-bore valve having uniform diameters throughout their lengths to maintain laminar flow of catalyst to or from a pressurizable hopper vessel.

15 Claims, 3 Drawing Sheets

FIG_1

FIG_2

FIG_3

FIG_4

FIG_6

FIG_5

FIG_7

5,302,357

APPARATUS FOR AN ON-STREAM PARTICLE REPLACEMENT SYSTEM FOR COUNTERCURRENT CONTACT OF A GAS AND LIQUID FEED STREAM WITH A PACKED BED

This application is a continuation of Ser. No. 07/727,656, filed Jul. 9, 1991, now abandoned, which is a division of Ser. No. 07/381,948, filed Jul. 19, 1989, now U.S. Pat. No. 5,076,908, issued Dec. 31, 1991.

FIELD OF THE INVENTION

The present invention relates to on-stream catalyst replacement during hydroprocessing of a hydrocarbon feed stream.

More particularly, it relates to a method of, and apparatus for, economically utilizing space within a hydroprocessing vessel over a wide range of processing rates without substantial fluidization or ebulation of a packed bed of catalyst during high counterflow rates of the hydrocarbon feed and a hydrogen containing gas through the packed bed, while maintaining continuous or intermittent replacement of catalyst for plug-like flow of the bed through the vessel. Such plug flow with high processing rates is obtained by selecting the size, shape and density of the catalyst particles to prevent ebulation and bed expansion at the design flow rate so as to maximize the amount of catalyst in the vessel during normal operation and during catalyst transfer. Catalysts are selected by measuring bed expansion in a large pilot plant run with hydrocarbon, hydrogen and catalyst at the design pressures and flow velocities within the available reaction volume of the vessel. Catalyst is removed from the bed by laminar flow of the catalyst particles in a liquid slurry system in which the liquid flow line is uniform in diameter, and substantially larger than the catalyst particles, throughout the flow path between the reactor vessel and a pressurizable vessel, including passageways through the flow control valves.

BACKGROUND OF THE INVENTION

Hydroprocessing or hydrotreatment to remove undesirable components from hydrocarbon feed streams is a well known method of catalytically treating such hydrocarbons to increase their commercial value. "Heavy" hydrocarbon liquid streams, and particularly crude oils, petroleum residua, tar sand bituman, shale oil or liquefied coal or reclaimed oil, generally contain product contaminants, such as sulfur, and/or nitrogen, metals and organometallic compounds which tend to deactivate catalyst particles during contact by the feed stream and hydrogen under hydroprocessing conditions. Such hydroprocessing conditions are normally in the range of 212° F. to 1200° F. (100° to 650° C.) at pressures of from 20 to 300 atmospheres. Generally such hydroprocessing is in the presence of catalyst containing group VI or VIII metals such as platinum, molybdenum, tungsten, nickel, cobalt, etc., in combination with various other metallic element particles of alumina, silica, magnesia and so forth having a high surface to volume ratio.

Because these reactions must be carried out by contact of a hydrogen-containing gas with the hydrocarbon feed stream at elevated temperatures and pressures, the major costs of such processing are essentially investment in vessels and associated furnaces, heat exchangers, pumps and tubing capable of such service and the replacement cost of catalyst contaminated in such service. Commercial hydroprocessing of relatively low cost feed stocks such as crude oils containing pollutant compounds, requires a flow rate on the order of a few thousand up to one hundred thousand barrels per day, with concurrent flow of hydrogen at up to 10,000 standard cubic feet per barrel of the liquid feed. Vessels capable of containing such a reaction process are accordingly cost-intensive both due to the need to contain and withstand metal embrittlement by the hydrogen, while carrying out the desired reactions, such as demetalation, denitrification, desulfurization, and cracking at elevated pressure and temperatures. For example, because of metallurgy and safety requirements, such vessels may cost on the order of $700.00 per cubic foot of catalyst capacity. Thus a vessel capable of handling 25,000 barrels per day of a hydrocarbon feed stream may run on the order of $4,000,000 to $5,000,000. Pumps, piping and valves for handling fluid streams containing hydrogen at such pressures and temperatures are also costly, because such pressure seals must remain hydrogen impervious over extended service periods of many months.

Further, hydroprocessing catalyst for such a reactor, which typically contains metals such as titanium, cobalt, nickel, tungsten, molybdenum, etc., may involve a catalyst inventory of 500,000 pounds and a cost $2 to $4/lb. Accordingly, for economic feasibility in commercial operations, the process must handle high flow rates and the vessel should be filled with as much catalyst as possible to maximize catalyst activity and run length. Additionally, the down-time for replacement or renewal of catalyst must be as short as possible. Further, the economics of the process will generally depend upon the versatility of the system to handle feed streams of varying amounts of contaminants such as sulfur, nitrogen, metals and/or organic-metallic compounds, such as those found in a wide variety of the more plentiful (and hence cheaper) crude oils, residue, or liquefied coal, tar sand bitumen or shale oils, as well as used oils, and the like.

In prior systems for hydroprocessing, it is known to flow a liquid hydrocarbon feed and a hydrogen stream concurrently with the catalyst in a downward flow path. While this assures high packing density for the catalyst, without ebulation or expansion of the bed, such processes have a tendency to form local deposits of feed metals that plug the bed, particularly at the top catalyst bed in the vessel. Accordingly, in general, it is preferred to counterflow the catalyst and process fluid streams relative to each other. However, as noted above, when the process feed rates are high, the volume of catalyst that can be contained by the vessel may be as little as 10% of the original settled volume. At lower fluid velocities, catalyst volume may be up to about 80% to 90%, but useful reaction space for the process is still wasted and turbulence causes axial mixing of the catalyst which interferes with the desired plug flow movement. Therefore, it is a particular object of this invention to run a counterflow processing system where the catalyst and fluid velocity combinations limit bed expansion to less than 10%.

It is also known to use a series of individual vessels stacked one above the other, with fluid flow either concurrent or counterflow to catalyst. In such a process, catalyst moves by gravity from the upper vessel to a lower vessel by periodically shutting off, or closing, valves between the individual vessels. In a counterflow system, this permits removal of catalyst from the lower-most or first stage vessel, where the most contaminated, or raw, feed stock, originally contacts the catalyst. In this way, most of the major contaminating components in the hydrocarbon stream are removed before the hydrocarbon material reaches major conversion steps of the process performed in higher vessels of the stacked series. Thus, most of the deactivating components of the feed stream are removed before it reaches the least contaminated catalyst added to the topmost vessel. However, such systems require valves suitable for closing off catalyst flow against catalyst trapped in the line. Hence, valve life is relatively short and down-time for replacement or repair of the valves is relatively costly.

Alternatively, continuous operation of the hydroprocessing system has included counterflow of catalyst downwardly through a single vessel or a series of vessels in which a hydrocarbon feed stream and hydrogen gas flow upwardly through the catalyst at rates sufficient to ebulate the bed. Such ebulation has been considered desirable or essential to permit withdrawal of catalyst from the lower part of the vessel for slow, but continuous or periodic, removal of catalyst from the vessel. As noted above, such ebulation tends to increase the fluid volume in the vessel relative to catalyst volume necessary to hydroprocess the feed stream and hydrogen with the catalyst, with adequate contact time to react the fluids. Further, such ebulated beds tend to result in separation or segregation of "fines" from the larger (and heavier) particles as they pass downwardly through the upflow streams. As frequently happens, and especially where the catalyst is locally agitated, as by eddy currents, the particles tend to abrade by such higher flow rates of the feed streams through the ebulating bed. Depending on the size of the fines, they either travel upward where they contaminate the product or plug the outlet screen or they tend to accumulate in the reactor because they cannot work their way down to the bottom of the bed. Such counterflow systems have also been used because of the relative ease of withdrawing limited amounts of the ebulated catalyst in a portion of the reacting hydrocarbon and hydrogen fluids, particularly where such turbulent flow of the catalyst is needed to assist gravity drainage through a funnel-shaped opening into a central pipe at the bottom of a vessel.

While it has been proposed heretofore to use plug-flow or packed-bed flow of catalyst to reduce such agitation and thus assure uniform disbursement of hydrogen throughout the liquid volume flowing upwardly through the catalyst bed, in general such flow has been controlled by limiting the maximum flow rate that can be tolerated without ebulating or levitating the bed more than about 10%. Further in prior systems where expansion of the bed is limited, hydrogen flow rates are made sufficiently high at the bottom of the bed to assure relative turbulence of the catalyst at the withdrawal point in the vessel. While this does assure such turbulence, it also wastes space, damages the catalyst and permits direct entrainment of hydrogen with catalyst entering the withdrawal tube. Such turbulent flow of catalyst is apparently necessary to assist gravity removal of catalyst from the vessel.

As particularly distinguished from prior known methods of on-stream catalyst replacement in hydroprocessing, the present method and apparatus provides a system wherein plug flow of the bed is maintained over a wide range of high counterflow rates of a hydrocarbon feed stream and hydrogen gas throughout the volume of the packed catalyst bed. Such packed bed flow maintains substantially maximum volume and density of catalyst within a given vessel's design volume by controlling the size, shape and density of the catalyst so that the bed is not substantially expanded at the design rate of fluid flow therethrough. The proper size, shape and density are determined by measuring bed expansion in a large pilot plant run with hydrocarbon, hydrogen and catalyst at the design pressures and flow velocities as particularly described in Example 2. To further control such packed bed flow, the bed level of catalyst within the vessel is continuously measured, as by gamma ray absorption, to assure that little ebulation of the bed is occurring. Such control is further promoted by evenly distributing both the hydrogen and liquid feed throughout the length of the bed by concentrically distributing both the hydrogen gas component and the hydrocarbon fluid feed component in alternate, concentric annular paths across the full horizontal cross-sectional area of the vessel as they both enter the catalyst bed. Additionally, and as desirable, hydrogen is evenly redistributed and if needed, augmented, through a quench system at one or more intermediate levels along the length of the catalyst bed. Equalizing hydrogen and liquid feed across the full horizontal area along the length of the packed particle bed prevents local turbulence and undesirable vertical segregation of lighter particles from heavier particles flowing in a plug-like manner downwardly through the vessel.

Further in accordance with the method, a system for replacing catalyst during continuing operation of the non-ebulating bed is assisted by carrying out the process at relatively high liquid feed rates, even without ebulation of the bed. In a preferred form, the catalyst transfer system includes an inverted J-tube as the withdrawal tube, so that the tube opens downwardly adjacent the center of the lower end of the vessel and directly above a center portion of the surrounding annular flow paths of liquid and gas into the catalyst bed. Thus the intake for catalyst is out of the direct flow of such streams, and particularly the gas flow. In such a preferred form the annular flow paths are through a conical or pyramidal screen, or perforated plate, which supports the bed or column of catalyst across the vessel through a plurality of radially spaced apart and axially elongated concentric rings, or polygons, supported by radial arms extending from the center of the vessel to the cylindrical side wall of the vessel. Each ring is formed by a pair of peripheral members extending between the radial arms directly under the conical screen so that this forms a circular gas pocket at the upper level in each ring so that between each pair of said peripheral members alternate rings of gas and hydrocarbon liquid enter the bed simultaneously.

In accordance with a further preferred form of the invention, catalyst is both withdrawn from the bed and added to the vessel under laminar flow conditions as a liquid slurry to avoid abrasion and size segregation of particles during such transfer. Both the supply and withdrawal flow lines have a minimum diameter of at least five times and, preferably more than twenty times, the average diameter of the catalyst particles. Further, the flow lines are of uniform diameter throughout their length from either the catalyst supply chamber to the vessel, or from the vessel to the receiving chamber, including the through bore of a rotatable ball of the isolating, pressure control valves, known commercially as "full-port valves". Additionally, in each case a flush line is connected to the flow line between the isolating valve and the reactor vessel so that liquid hydrocarbon may be used to flush the line of catalyst or catalyst fines if necessary, before the valve ball is closed. Preferably, but not necessarily, the withdrawal line may include means for flowing auxiliary hydrogen back into the reactor through the withdrawal tube to prevent coking due to hydrogen starvation near or in the withdrawal tube.

The prior art does not disclose or suggest the above enumerated and pertinent features of either the total system or significant portions of such a system, as disclosed by the following patents:

U.S. Pat. No. 4,312,741, Jacquin, et al., is directed toward a method of on-stream catalyst replacement in a hydroprocessing system by controlling the feed of hydrogen gas at one or more levels. Catalyst, as an ebulated bed counterflows through the reactor but is slowed at each of several levels by horizontally constricted areas which increase the hydrogen and hydrocarbon flow rates to sufficiently locally slow downward flow of catalyst. While local recycling thus occurs at each such stage, rapid through-flow of fresh catalyst, with resultant mixing with deactivated or contaminated catalyst, is suppressed. The ebulating bed aids simple gravity withdrawal of catalyst from the vessel. Improvement of the disclosed system over multiple vessels with valves between stages is suggested to avoid the risk of rapid wear and deterioration of valve seals by catalyst abrasion.

U.S. Pat. No. 3,716,478, Kodera, et al., discloses low linear velocity of a mixed feed of liquid and $H_2$ gas to avoid expansion (or contraction) of catalyst bed. By low linear velocity of fluid upflow, gas bubbles are controlled by flow through the packed bed, but the bed is fluidized by forming the bottom with a small cross-sectional area adjacent the withdrawal tube. This assists discharge of catalyst without back-mixing of contaminated catalyst with fresh catalyst at the top of the single vessel. The range of the bed level in the vessel is from 0.9 to 1.1 of the allowable bed volume ($\pm 10\%$) due to fluid flow through the bed. A particular limitation of the system is that flow of the fluids undergoing catalytic reaction is restricted to a rate that will not exceed such limits, but must be adequate to ebulate the bed adjacent the catalyst withdrawal tube. Alternatively, injection of auxiliary fluid from a slidable pipe section is required. The patentees particularly specify that the diameter of the lower end of the vessel is smaller to increase turbulence and ebulation of catalyst adjacent the inlet to the catalyst withdrawal line. Fluidization of catalyst is accordingly indicated to be essential to the process. However the disclosed gas flow rates are well below commercial flow rates and there is no suggestion of temperatures or pressures used in the tests or the size, density or shape of the catalyst.

U.S. Pat. No. 4,571,326, Bischoff, et al., is directed to apparatus for withdrawing catalyst through the center of a catalyst bed counterflowing to a liquid hydrocarbon and gas feed stream. The system is particularly directed to arrangements for assuring uniform distribution of hydrogen gas with the liquid feed across the cross-sectional area of the bed. Such uniform distribution appears to be created because the bed is ebulating under the disclosed conditions of flow. Accordingly, considerable reactor space is used to initially mix the gas and hydrocarbon liquid feeds in the lower end of the vessel before flowing to other bottom feed distributors. The feeds are further mixed at a higher level by such distributor means in the form of "Sulzer Plates" or a "honeycomb" of hexagonal tubes beneath a truncated, conical, or pyramidal-shaped funnel screen. The arrangement may include an open ramp area parallel to the underside of the screen between the tube or plate ends. Further, to maintain gas distribution along the length of the catalyst bed, quench gas is supplied through upflowing jets in star-shaped or annular headers extending across middle portions of the vessel. The arrangement for withdrawal of spent catalyst requires ebulation of at least the lower portion of the bed. As noted above, added vessel space for uniform mixing of hydrogen and feed before introducing the fluids into an ebulated bed, as well as an ebulating bed, increases the required size of the hydroprocessing vessel, increases catalyst attrition, increases catalyst bed mixing and substantially increases initial, and continuing operating costs of the system.

U.S. Pat. No. 4,639,354, Bischoff, et al., more fully describes a method of hydroprocessing, similar to U.S. Pat. No. 4,571,216, wherein similar apparatus obtains uniform ebulation through the vertical height of a catalyst bed, including a quench gas step.

U.S. Pat. No. 3,336,217, Meaux, is particularly directed to a catalyst withdrawal method from an ebulating bed reactor. In the system, catalyst accumulating at the bottom of a vessel and supported on a flat bubble-tray may be withdrawn through an inverted J-tube having a particular ratio of the volume of the short leg of the J-tube to the longer leg. The diameter of the J-tube is suited only to flow of catalyst from a body of catalyst ebulated by the upflowing hydrocarbon feed and gas.

U.S. Pat. Nos. 4,444,653 and 4,392,943, both to Euzen, et al., disclose removal systems for catalyst replacement in an ebulating bed. In these patents, the fluid charge including hydrocarbon containing gas is introduced by various arrangements of downwardly directed jets acting laterally against or directly onto the conical upper surface of the bed support screen or screens. Alternatively, the feed is introduced through a conical screen after passing through a distributor arrangement of tortuous paths or a multiplicity of separate tubes to mix the gas and liquid feed over the conical screen. Such arrangements use a considerable volume of the pressure vessel to assure such mixing.

U.S. Pat. Nos. 3,730,880 and 3,880,596 both to Van der Toorn, et al., disclose a series of catalytic reactors wherein catalyst moves downwardly by gravity from vessel to vessel through check valves. As noted above, such valves require opening and closing to regulate the rate of flow, or to start and stop catalyst transfer, with catalyst in the valve flow path. Feed of process fluids is either co-current or countercurrent through the catalyst bed.

U.S. Pat. No. 4,259,294, Van ZijllLanghaut, et al., is directed to a system for on-stream catalyst replacement by entrainment of the catalyst in oil pumped as a slurry either to withdraw catalyst from or to supply fresh catalyst to, a reactor vessel. Reacting feed is suggested to be either co-current or countercurrent with catalyst flow through the reactor. Valves capable of closing with catalyst in the line, or after back-flow of slurry oil, are required to seal off the catalyst containing vessel at operating temperatures and pressures from the receiving reactor vessel, or isolate the catalyst receiving lock hopper from the withdrawal section of the vessel.

U.S. Pat. Nos. 3,470,090, Carson, and 4,167,474, Sikama, respectively illustrate multiple single bed reactors and multi-bed reactors in which catalyst is replaced either continuously or periodically. The feed and catalyst flow co-currently and/or radially. Catalyst is regenerated and returned to the reactor, or disposed of. No catalyst withdrawal system is disclosed apart from either the configuration of the internal bed support or the shape of the vessel bottom to assist gravity discharge of catalyst.

SUMMARY OF THE INVENTION

In accordance with one aspect of the present invention there is provided a method of periodically or semi-continuously transferring catalyst into and out of a substantially packed bed of catalyst flowing downwardly at a desired rate through a reactor vessel during hydroprocessing over a wide range of counterflow rates of a hydrocarbon feed stream and a hydrogen containing gas flowing upwardly through the vessel. Such plug-like flow of the packed catalyst bed is achieved by selecting the average density, size, and shape of the catalyst particles forming the bed so that the bed expands by less than 10% at the maximum anticipated fluid flow velocities of the gaseous and liquid components therethrough. Desirably such movement and bed level of such catalyst is continuously monitored to prevent overfilling and to assure minimum ebulation and attendant wastage of reactor space and particle size segregation. Uniformity of gas flow is maintained across the cross-sectional area of the vessel and the full volume of the bed so as to avoid ebulation of the bed, including eddy currents or localized recirculation, of catalyst particles moving downwardly in plug-like flow through the vessel. Preferably the gaseous component of the feed stream is uniformly distributed through a plurality of annular concentric rings, or polygons, formed by axially extending annular and radially spaced apart concentric supports under a truncated conical or pyramidal support screen. Such supports are axially elongated sufficiently to form a plurality of pairs of connected annular gas pockets and adjacent concentric liquid annular feed rings between each adjacent pairs of annular supports. Thus, the catalyst bed is provided with uniformly concentric annular and alternate feed rings of both liquid and gas across the full cross-sectional area of the downwardly flowing catalyst bed.

In accordance with another aspect of the invention, the system for introduction of quench gas at an intermediate level in the vessel maintains the plug-like flow of catalyst downwardly through the vessel. Quench gas is introduced by a plurality of transversely extending pipe members covered or shrouded by inverted V-shaped sheds. Each shed overlies a quench gas supply pipe and acts to deflect catalyst outwardly and downwardly over the apices. Each of the distributor sheds preferably includes a plurality of elongated slots along the lower edges of the transverse sides. These slots form lateral gas redistribution channels for both upwardly flowing process gases and quench gas introduced through the transverse pipes.

Additionally the invention relates to methods and apparatus for on-stream replacement of catalyst without local levitation or ebulation of catalyst particles around the withdrawal point within the catalyst bed by laminarly flowing a liquid hydrocarbon stream either into, or out of, the reactor vessel through a pair of flow paths. Each of the flow paths has a substantially constant cross-sectional area throughout its length and a diameter at least five times the average diameter of the catalyst particles flowing between said vessel and at least one and preferably two, pressurizable catalyst lock-hoppers or receptacles, serving respectively to supply fresh catalyst to the top of the bed and to remove spent catalyst from the bottom. Further, each flow path includes at least one in-line control valve having a through-bore of substantially the same diameter as the flow path and at least one auxiliary fluid flow path for introducing fluid flow into the slurry path for flushing catalyst particles from the path. Preferably the flush fluid is a liquid, and selectively, by reverse hydrogen flow through the line when catalyst is not being moved, particles are blocked from entering the flow path and coking is prevented at the entry to the flow tube. The hopper vessels are selectively pressurizable as required to induce such laminar flow of liquid-entrained catalyst to feed replacement catalyst into the upper end of the reactor vessel and to withdraw spent catalyst from the lower end of the vessel. Desirably, each of the flow paths is characterized by an inverted J-tube, which includes an inlet portion for the liquid stream and entrained catalyst having a reverse upward flow section substantially shorter than the downward flow path. Preferably, in the reactor vessel the inlet portion for withdrawing catalyst is disposed above an unperforated central portion of the conical bed support screen so that such catalyst withdrawal position is adjacent the bed bottom, but substantially out of the concentric feed path for upwardly flowing liquid hydrocarbon feed and gas streams. This avoids gas entrainment with the catalyst slurry, as by ebulation of the bed around the intake point.

As used herein "catalyst" includes other particles which interact with a feed stream, such as sorbents, or other fluid contact bodies.

From the foregoing summary it will be apparent that several significant factors contribute directly to efficient use of a given process vessel to assure non-ebulating, plug-like flow of a body of catalyst particles while being contacted by a counter-flowing hydrocarbon fluid stream of gas and liquid therethrough at maximum space-velocity. Among such significant factors are 1.) the size, volume and density characteristics of such particles at preselectable flow velocities and pressures of the hydrocarbon fluid stream; 2.) control of bed ebulation and/or levitation during hydrocarbon fluid flow; 3.) laminar flow of the catalyst particles during movement into and out of the moving bed for replacement or regeneration without bed ebulation or levitation; 4.) concentric annular feed of alternate rings of the gas and liquid components of the hydrocarbon feed uniformly into the full moving catalyst bed which is capable of recovering promptly from upset or pressure changes in the vessel to restore such alternate rings of gas and liquid over process runs of extended length (e.g. several thousand hours); and 5.) redistribution of the gas components along the axial length of the moving bed.

Further objects and advantages of the present invention will become apparent from the following detailed description of the preferred embodiments of both the method and apparatus aspects of the invention, taken in conjunction with the accompanying drawings.

BRIEF DESCRIPTION OF THE DRAWINGS

In the drawings:

FIG. 5 is a cross-sectional plan view of the catalyst vessel taken in the direction of arrows 5—5 in FIG. 1 showing a preferred form of gas redistribution and quench system over a central portion of the catalyst bed.

FIG. 6 is a perspective view, partially in cross-section, of one of the quench or redistribution shed units shown in FIG. 5.

FIG. 7 is a perspective view of a preferred arrangement of two tiers of shed units of FIGS. 5 at a given level in the catalyst bed.

PREFERRED EMBODIMENTS OF THE INVENTION

Figure 1:
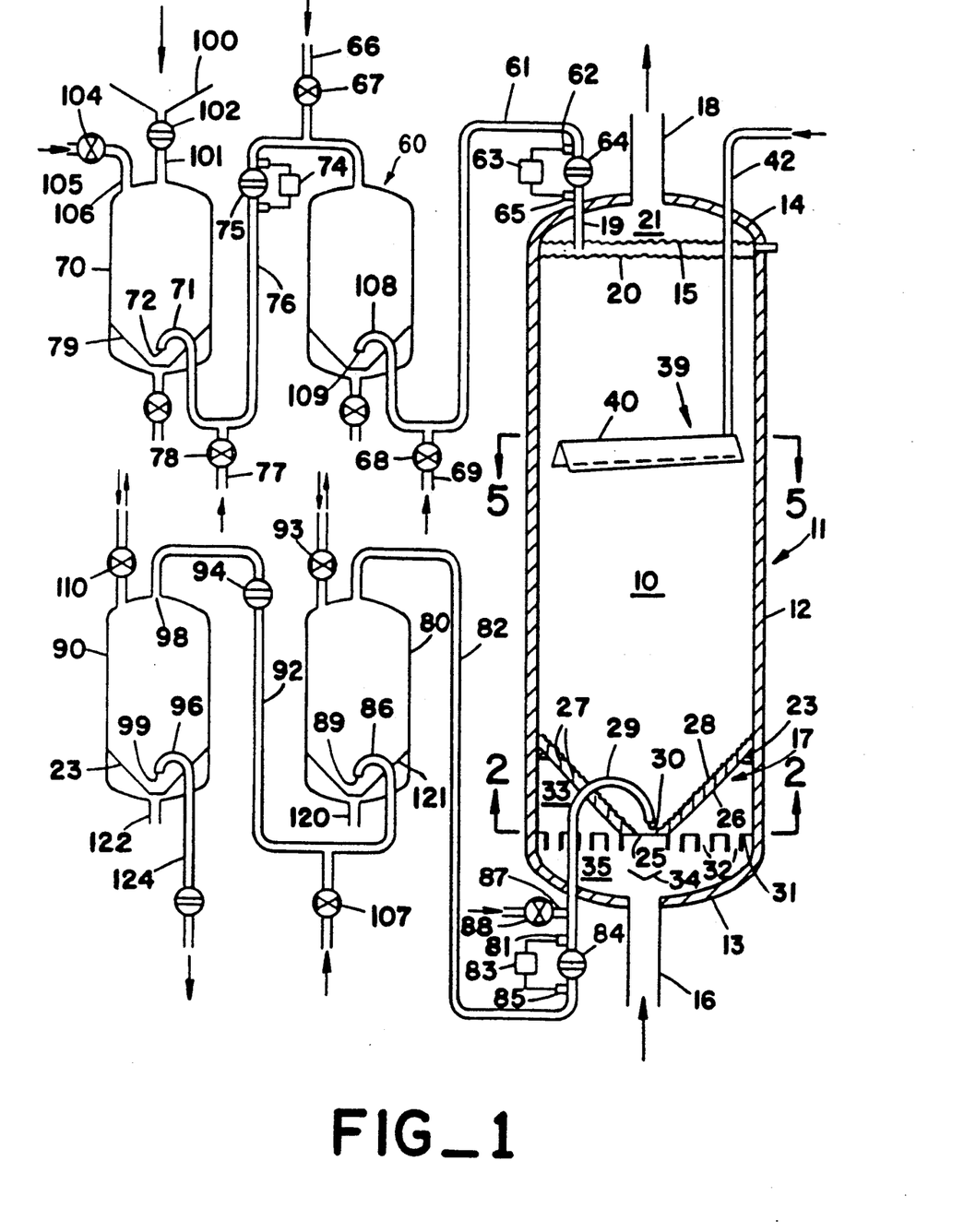
FIG. 1 is a schematic view of a typical hydroprocessing vessel to which the present invention is particularly directed for on-stream catalyst replacement during continuous plug-like flow of catalyst through up-flowing liquid hydrocarbon feed and gas streams.

Referring now to FIG. 1, a hydroprocessing system is shown embodying the method of the present invention to increase substantially both the continued catalytic activity of a volume or bed of catalyst 10 and the efficient use of a single reactor vessel of a given volume, such as reactor vessel 11. Vessel 11, as indicated by the thickness of its cylindrical side wall 12 and domed closure heads, or ends, 13 and 14, is designed to react a hydrogen containing gas mixed with a liquid hydrocarbon stream at a pressure of up to about 300 atmospheres (about 4500 lbs per square inch) and up to about 650° C. (about 1200° F.). Such reaction gas and a feed stream of hydrocarbon liquids are preferably premixed and introduced as a single stream through bottom head 13 by line 16.

To assure maximum catalytic benefit during the hydroprocessing of the hydrocarbon feed stream and the hydrogen-containing gas, it is essential that vessel 11 contain as much catalyst as possible within the design volume of vessel 11. Accordingly as indicated, support means 17 for bed 10 is placed as low as possible in vessel 11 while assuring full and adequate dispersion of the hydrogen phase within the liquid hydrocarbon stream. At the same time, the upper limit of bed 10 is near the top of domed head 14, while providing adequate space 21 for disengaging any entrained catalyst from the resulting products withdrawn through center pipe 18. To insure that catalyst is not entrained into product fluids exiting through center pipe 18, a screen 15 may be installed in space 21 above bed surface 20. Fresh catalyst is then added to surface 20 through pipe 19 extending through screen 15. Desirably, the upper level of bed 10, designated as 20, is preferably controlled on a continuous basis by gamma ray absorption measurement made possible by a gamma ray source 22 and gamma ray detector 24 positioned at the top 20 of bed 10. Such a gamma ray source may be in the form of radioactive isotopes, such as Cesium 137, disposed inside the reactor. Alternatively the source can be an electrically controllable source, such as a thermal neutron activated gamma ray generator. Detector 24 may be in the form of an ionization tube, Geiger-Mueller tube or a scintillation detector. Suitable sources and detectors are manufactured by Ronan Engineering Co. By detecting the level of surface 20, it is possible, in accordance with the invention, to insure that the catalyst inventory is maintained at the optimum level and that the reactor is never overfilled. Overfilling the reactor increases the chance that catalyst particles will be crushed in the isolation valves in the transfer lines when they are closed, at the end of each transfer. Bed level control is also needed to confirm that ebulation of the bed is minimized and that undesirable excursions from the design flow rate for hydrogen and hydrocarbon feed flowing upwardly through bed 10 are avoided for the selected catalyst. To this end, the size, shape, and density of catalyst particles supplied to the bed are selected in accordance with the designed maximum rate of flow of the feed streams to prevent such ebulation. Such control assures that bed 10 progressively moves down through vessel 11 as by a plug flow. Catalysts are selected by measuring bed expansion in a large pilot plant run with hydrocarbon, hydrogen and catalyst as described below and illustrated in Example 2.

To further assure that plug flow continues throughout the full length of the bed, and particularly at the bottom portion, bed support means 17 is particularly characterized by the truncated polygonal or conical configuration of support means 17.

Figure 2:
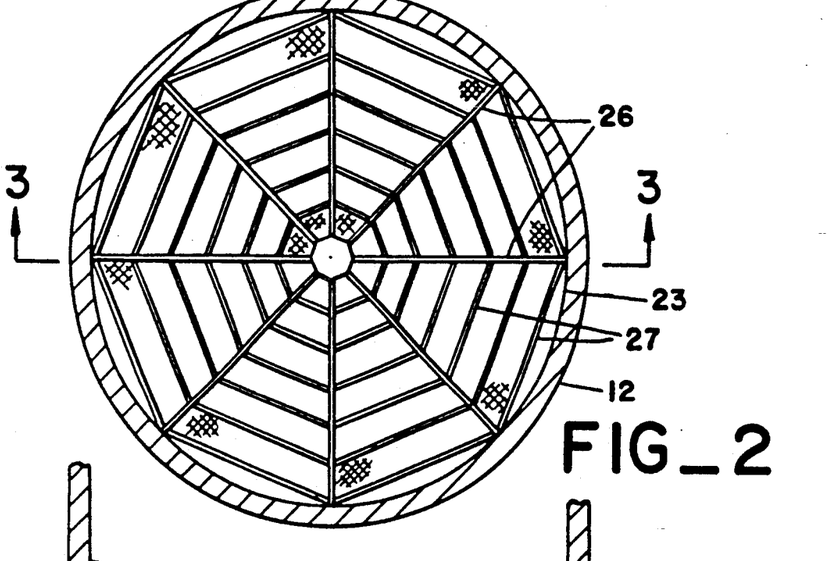
FIG. 2 is a bottom plan view of the concentric and radial catalyst bed support means for a truncated conical or pyramidal screen, taken in the direction of arrows 2—2 in FIG. 1.
Figures 3, 4:
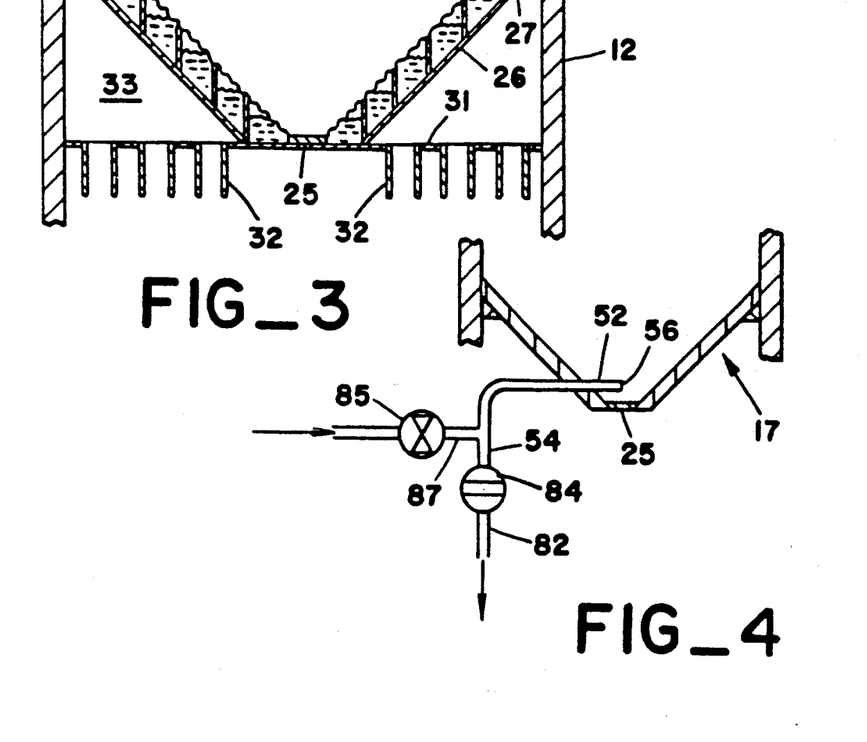
FIG. 3 is an elevational cross-section view of the support means and screen taken in the direction of arrows 3—3 in FIG. 2.
FIG. 4 is a partial elevation view of an alternate form of a laminar flow arrangement for withdrawing deactivated catalyst particles from the reactor bed.

As shown in the preferred embodiment of FIGS. 2 and 3, and best seen in FIG. 2, support 17 includes a series of annular polygons, approaching the form of annular rings, formed by a plurality of segment plates 27 between radial spoke members 26 extending from imperforate center plate 25 to sidewall 12 of vessel 11. As shown in FIG. 3, spokes 26 are substantially flat plates which divide the circumference of the vessel into many segments (eight in this case) and similarly support the ends of outer octagonal ring 23 of support means 17 formed by annular or circumferential plates 27. In each case, radial ribs or spokes 26, and annular segment plates 27 form a plurality of concentric rings, or annular polygons which support conical, or pyramidal, perforated plate or screen 28. Thus screen 28 is permeable to both gas and liquid rising from the lower portion of vessel 11.

The particular merit of the concentric annular polygons as illustrated in FIG. 3, is that with each of plates 26 and 27 extending axially parallel to sidewall 12 of vessel 11, the mixture of the hydrocarbon liquid feed and hydrogen gas entering the bed separates by gravity into radially alternate gas and liquid rings, made up of adjacent segments between each pair or radial spokes 26. Thus, both phases flow upwardly through alternate concentric annular passages under screen 28. The preferential separation of gas from liquid in each ring includes an annular cap segment of gas overlying an adjacent lower annular segment filled with liquid. Hence, both fluids have equal, and annularly adjacent, access to the bed through screen 28. The plurality of alternate annular rings of hydrogen gas and hydrocarbon liquid assure even and equal feed of both phases across the full cross-sectional area of screen 28 into bed 10. Among other factors, we have particularly found that this configuration insures even and equal distribution across the full cross-sectional area of the catalyst bed. Such equal distribution across the full diameter of the bed 10, permits a quiescent flow section to form directly above center plate 25 which truncates conical bed support means 17. This decreases substantially potential local ebulation or eddy currents from being induced in the catalyst bed at the point of catalyst withdrawal through inlet 30 of inverted J-tube 29 to assure localized laminar flow of catalyst and liquid from within bed 10.

Uniform feed of the mixture of the hydrocarbon feed stream and hydrogen is particularly facilitated to the inlet side of plates 27 of support means 17 through plenum or inlet chamber 33 enclosed between support 17 and circular plate member 31, which extends across the full cross-sectional area of vessel 11. Plate 31 includes a multiplicity of similar large diameter tubes 32 forming openings through plate 31. Each tube is several inches in diameter and extends axially to a similar depth, say on the order of 4 to 6 inches, below plate 31. Tubes 32 provide equal access to the mixture of hydrogen and hydrocarbon feed stream into plenum chamber 33. Even distribution of the incoming feed stream into bottom header 35 from feed line 16 may also be assisted by deflector plate 34 to assure that oversized bubbles of hydrogen that may be contained in the feed stream will be equally distributed across the full cross-sectional area of plate 31 and equally distributed to each of tubes 32 for flow into plenum chamber 33. The length of tubes 32 may be selected to form a suitable gas head under plate 31 to suppress surges in the feed streams entering header 35.

As noted above, the vertical or axial length of plates 27 which set off each individual annular and radial segment, provide equal access to both hydrogen and liquid feed into catalyst bed 10, and are stepped under screen 28 so that they effectively form rings of gas and hydrocarbon feed alternately across the full diameter at the inlet side of bed 10. In this way, no single area of the inlet to bed 10 becomes a segregated or preferential, flow path for either gas or the liquid. Further, if pressure surges result in full wetting of screen 28 by the liquid phase, recovery of gas flow is assisted by the areal breadth of each segment between plates 27 and radial plates 26.

The arrangement in inlet distributor 31 for uniformly distributing hydrogen gas and liquid hydrocarbon feed as shown in FIG. 3 may be modified by lengthening or shortening tubes 32 forming uniformly distributed cylindrical passageways into plenum chamber 33, a particular advantage of using tubes, as compared to merely perforations or holes of adequate diameter, lies in the formation of a gas pocket under plate 31 in the areas around the individual tubes 32. We have found that this is desirable because such a gas pocket trapped beneath tray or plate 31 provides pressure surge dampening, which may result from flow changes of the mixture of hydrogen and liquid being supplied to the reactor vessel. However, the length of the tubes is maintained as short as reasonably possible to so function. Again, this is because of the desirability of utilizing as little as possible of all processing space available in vessel 11 for anything but contacting the feed streams with conversion catalyst. A particular advantage to using tubes, as compared to a combination of tubes and perforations, is that the designed flow distribution pattern is maintained over a wider range of flow rates. With tubes and perforations, gas normally flows up the perforations and liquid flows up the tubes. However, gas will find new flow paths through the tubes if the gas flow increases or the perforations become plugged, resulting in undesigned and potentially undesirable flow patterns.

To further assist in maintenance of plug-like flow of catalyst bed 10 throughout its axial length, there is additionally provided in the preferred form of the invention a plurality of axially spaced apart hydrogen gas redistribution or hydrogen gas-quenching stages 39 within bed 10. In the arrangement of FIG. 1, the location of one of the gas redistribution stages 39 is illustrated by the single inverted angle member 40 extending transverse to the axis of bed 10. The details of quench system 39 are best seen in FIGS. 5 to 7 where a plurality of inverted v-shaped sheds 40 are equally distributed over at least one transverse row extending generally across the cross-sectional area of vessel 11. As in FIG. 7, a gas injection line 42 feeds an elongated tube 41 extending through each individual shed 40 from a header 44 and branch lines 45 supplying the individual tubes 41. Desirably, but not necessarily, a second tier of sheds 40 is axially spaced above the first tier, with the sheds in each tier being positioned at 90° to the other tier, as shown in FIG. 6. Construction of an individual shed 40 is best seen in FIG. 5, wherein distribution pipe 41 includes a plurality of discharge holes 48, desirably proportioned to give equal distribution of hydrogen gas along the full length of tube 41. Desirably, holes 48 are on the top side of tube 41 so that gas leaving the tube is forced to flow downwardly within shed 40 to join gas rising from bed 10 under the area enclosed by the V-sides 49 of shed 40. Preferably, the full length of each skirt formed by sides 49 includes equally spaced slots 50 to exhaust both rising gas from bed 10 and quench gas entering from line 42. A particular value of the present arrangement is that gas which may have become channeled in a portion of the bed below the quench system can be redistributed across the full cross-sectional area of the bed to further avoid generation of local hot spots, eddy currents, or ebulation, within the upper portion of bed 10.

In accordance with another significant aspect of the present invention, FIG. 1 shows a catalyst replacement system, which in general comprises a series of lock chambers for transferring fresh catalyst into bed 10 through a pair of pressure lock chambers, including charging hopper 60 and supply hopper 70. A similar series of lock chambers, including discharge hopper 80 and disposal hopper 90, transfer catalyst out of bed 10. If necessary, a single pair of hoppers could be used to charge and discharge the catalyst, although the piping and sequencing procedure would be more complex. In both cases, transfer flow is specifically designed to be as a liquid slurry and laminar to avoid undue abrasion of catalyst particles going into vessel 11 and to avoid abrupt agitation of the overlying bed of particles, with consequent ebulation and eddying of catalyst or fines in bed 10, when catalyst is withdrawn through inlet 30 of J-tube 29 at the bottom of vessel 11.

To achieve laminar flow for supply of catalyst from charging supply hopper 60 to the top of vessel 11 or for catalyst removal from the bottom of bed 10 to discharge hopper 80, it is essential that the pressure differential between vessel 11 and hoppers 60 or 80, be accurately controlled as by detecting the pressure differences between supply line 61 or discharge line 82 and vessel 11. The pressure difference is best zero when shut-off valves 64 or 84 are first opened or closed. The pressure differences between vessel 11 and line 61 is measured by gage 63 and pressure detectors 62 and 65. Differential pressure gage 83 and detectors 81 and 85 serve a similar function to control transfer of catalyst through valve 84 from the bottom of vessel 11 to discharge hopper 80.

With reference particularly to supply of catalyst from vessel 60, it will be understood, of course, that the vessel is capable of being brought to a slightly higher pressure than the operating pressure of vessel 11, and closely controlled to assure that catalyst supplied to vessel 60 from storage hopper vessel 70 is by laminar flow.

For this purpose, as indicated, vessels 70 and 60 are at atmospheric pressure, catalyst is first introduced into a storage hopper 70 by way of funnel 100 through line 101 and valve 102, and nitrogen is preferably flushed through vessel 70 through line 104 and/or line 71 to eliminate air and moisture that may be present on the catalyst. Either before or after catalyst is introduced, vessel 70 is charged with a hydrocarbon refined stream, preferably vacuum gas oil, to provide the necessary slurrying liquid for mixing and transporting catalyst. This may either be through funnel 100, valve 102, and line 101, or through line 104, valve 105 and line 106. Valve 102 is then closed.

However, an important requirement is that before transferring liquid to the charging vessel, the pressure in supply vessel 70 must be equalized to that in charging vessel 60, assuming, of course, that isolation valve 64 between vessel 60 and the reactor vessel 11 is closed, and also that valves 67, 68 and 78 are closed. With valves 64, 67, 68, 78 and 102 closed and pressure equalized between the vessels 60 and 70, transfer valve 75 may be opened to provide the same diameter path for the catalyst slurry to flow throughout the path from J-tube 71 to vessel 60. The transfer is closely controlled by regulating the nitrogen gas flow rate and pressure introduced from line 104 through valve 105. The pressure and flow rate are just sufficient to assure the desired laminar flow of catalyst into inlet 72 of J-tube 71 and thus upwardly through line 76 and into lock hopper 60, which forms a catalyst charging vessel. Laminar flow to transfer catalyst through J-tube 71 is entirely in the liquid phase, with the catalyst as a slurry in the vacuum gas oil. Transfer of all catalyst is assisted by the funnel shape of bottom 79 of vessel 70, and the position of intake 72 to J-tube 71 at the apex of bottom 79. If all the catalyst in vessel 70 is transferred to vessel 60, flush oil from vessel 70 will naturally clear all the catalyst out of line 76. However, to assure that all such catalyst is through valve 75, (so that the valve need not close on hard, abrasive catalyst with potential danger of scoring the valve or the valve seat) additional flush fluid is preferably introduced from line 77 through valve 78 to clear line 76, either back into vessel 70, or forward into vessel 60.

With catalyst thus loaded into vessel 60, a similar procedure is used for transferring catalyst under laminar flow conditions as a liquid slurry into reactor vessel 11 through supply pipe 61 for distribution to the top 20 of bed 10. If desired, of course, a deflector plate may be used to distribute catalyst evenly across the top of bed 20. However, we have found that such a distribution aid is not required.

In transfer of catalyst from the lock hopper 60 to vessel 11, it will be understood that the pressure in vessel 60 is brought to the pressure of reactor vessel 11. This is done by injecting hydrogen through valve 67. The oil should be heated to a temperature as close as possible to the temperature of reactants in vessel 11, without vaporizing the oil. We have found this to be particularly important to reduce thermal shock of fresh catalyst being added to the reactor vessel. Once these requirements are met, valve 64 should be opened for transfer. The actual laminar transfer of the liquid slurry is controlled by valve 67 throttling the flow and pressure of hydrogen admitted from line 66. After transfer of the catalyst, valve 68 in flush line 69 is opened briefly to assure that any catalyst left in lines 61 and 19 is cleared before valve 64 is closed, for the reasons noted before. Excess hydrogen pressure in vessel 60 may be relieved by any suitable bleed line running back to the common hydrogen source of the hydroprocessing system. (not shown)

Substantially continuous or intermittent transfer of deactivated catalyst for regeneration or disposal from the bottom of bed 10, vessel 11 is controlled in the same way to discharge hopper or lock vessel 80. As in all transfer of catalyst throughout the system of the present invention, the flow path from inlet 30 of J-tube 29, through line 82, including the bore of valve 84, is uniform in cross-sectional area and diameter. Similarly, transfer from discharge hopper 80 to disposal vessel 90 is through inlet 89 of J-tube 86 to discharge outlet 98 of line 92, including valve 94, into vessel 90.

In general the diameter of these laminar flow passageways are at least five times, and may be as high as fifty or more times, the diameter of the individual particles to be passed therethrough. In this connection to avoid jamming or obstruction, the inlets 72, 109, 30, 89 and 99 into their respective tubes 71, 108, 29, 86 and 96 are not flared or otherwise restricted, or perforated, so that all flow is solely and directly through the full and equal bore of such inlets. In the case of catalyst removal from reactor vessel 11, inlet 30 of tube 29 is positioned at the unperforated center of catalyst support screen means 17, so that it is out of the direct flow of the hydrogen gas stream rising through the innermost annular passageway formed by walls 27 and dividers 26. This assures that flow into entry 30 is substantially a liquid only slurry mixture with catalyst particles. Such a mixture at laminar flow conditions produces maximum carrying capacity of the fluid. Additionally, the external dimensions of the circular bend or arc portion of the J-section of the tube 29 is several times the diameter of inlet 30 and the connected flow path, including the downwardly directed portion. The portion of tube 29 above inlet 30 is many times shorter and smaller in volume than the remainder of J-tube 29, down to, and including, control valve 84. A particular advantage of keeping this portion of tube 29 small is to avoid the necessity of forcing substantial amounts of catalyst back into the bed 11 against the gravity head of catalyst bed 10 when that portion of the line is cleared at the end of each transfer.

Desirably, during periods when the catalyst is not being transferred, a small amount of hydrogen may be continually bled through valve 88 into bed 10 through J-tube 29 to assure that catalyst particles do not clog entry 30. This avoids potential build up of coke at entry 30 of pipe 29. Such an arrangement assures that catalyst can be withdrawn by laminar flow without artificially fluidizing or levitating bed 11 directly adjacent to J-tube entry 30.

Because gravity drainage of catalyst by an opening through the center of the catalyst support screen means 17 is not required in the present arrangement, as in the prior art, it is possible to operate the entire system without use of solids handling valves. Accordingly, each of the transfer valves in the present arrangement are preferably conventional ball valves formed with a single through bore in a rotatable ball. Specifically, we have found that conventional valves used to feed and control flow of hydrocarbons, catalyst and hydrogen, into and out of the vessel 11, must seal against high pressure differentials between the vessel and the transfer hoppers. For this service, a solid stellite, spherical-ball gate having a through bore of the same diameter as the inlet and outlet lines to the valve and metal-to-metal seals, provides superior service when used in the catalyst transfer lines for carrying out the method of the present invention. Further, their commercial cost and ready availability for such severity of service makes them most useful economically, both for initial installation and for service replacement. Valves manufactured by The Kaymr and Mogas Companies, called full-part valves are particularly useful in the present embodiment. Further, the arrangement permits transfer of catalyst almost exclusively in a liquid phase which substantially reduces abrasion or comminution of catalyst particles during transfer. Additionally, exclusion of entrained gas substantially improves the efficiency of liquid transfer of catalyst particles and further reduces potential damage to the catalyst.

FIG. 4 illustrates a partial view of the bottom of pyramidal catalyst bed support 17 showing an alternate system for transferring catalyst in a laminarly flowing liquid. In this embodiment, an L-valve is formed by vertical tube 54 and horizontal tube 52 for withdrawing catalyst particles from the volume of bed 10. As shown, intake 56 is preferably directly above the central, non-perforated, section 25 of the truncated pyramid formed by screen support means 17. While such an arrangement is less preferred than that shown in the embodiment of FIG. 1, such an arrangement is made suitable by the fact that the slurry of liquid and catalyst can be made to flow only under laminar flow conditions.

With either the J-tube of FIG. 1, or the L-valve of FIG. 4, arrangements, the pressure in discharge lock vessel 80 is brought up to equal that in reactor vessel 11. Valve 84 is opened and catalyst flow is controlled, as seen in FIG. 1, by regulating flow through valve 93. Such flow decreases the gas-pressure in discharge lock chamber 80 and line 82 sufficiently to induce a laminar flow of catalyst particles from vessel 11 when transfer valve 84 is opened.

After valve 84 has been flushed with vacuum gas oil through valve 88 and line 87 and then closed, the residuum is drained from vessel 80 through drain line 120, below J-tube 86 and conical screen 121. Flush oil is then sent in through valve 93 to wash residuum off the catalyst and to cool the catalyst. The vessel can be drained and filled as many times as needed. The pressure in vessel 80 is then reduced to a lower pressure (about 50 psig or less). The pressure in vessel 90 is made equal to that in vessel 80 and valve 94 is opened. The flow and pressure are then controlled through valve 110 to induce laminar flow of catalyst through J-tube 86 and into vessel 90. Valve 94 is flushed with flush oil through valve 107 and closed. The flush oil is drained through drain line 122 below conical screen 123. This catalyst can be washed with water if desired through valve 110. The vessel should be purged of any hydrogen by sending in nitrogen gas also through line 110. Finally, vessel 90 is nearly depressurized and the catalyst is dumped using water as the carrier fluid through J-tube 96 by nitrogen flow through valve 110 to control the rate of catalyst flow in discharge pipe 124.

Following are examples of process runs conducted in accordance with method steps of the invention and using apparatus in accordance with the foregoing embodiment of the present invention.

EXAMPLE I

In a semi-commercial scale residuum conversion pilot plant operating at 100–200 BPD, the catalyst transfer procedure, as described above, was demonstrated more than 50 times. During each transfer, about 2 cubic feet of catalyst was moved into and out of the reactor vessel running continuously at typical residual desulfurization (RDS) conditions. Transfer rates up to 16 cubic feet per hour of catalyst were accomplished through pipes with an inside diameter 8 times larger than the catalyst diameter. Plug flow movement of the catalyst and the absence of bed ebulation were proven using radioactively tagged catalyst particles incorporated in the test bed.

Among the significant features of the invention specifically demonstrated in such runs were that: (1) ball valves, such as those made by the Kaymr and Mogas companies, can be used to isolate the RDS reactor from the catalyst transfer vessels, and to transfer catalyst particles without using solids handling valves, (2) the catalyst bed level and thus ebulation can be adequately monitored using a gamma-ray source and detector, (3) J-tubes (all with upward flow sections substantially shorter than the downward flow paths) will satisfactorily transfer catalyst particles, without local ebulation, by laminar fluid flow (4) use of fluid feed inlet distributor means with a conical support and concentric annular segment plates prevents ebulation at the base of the catalyst bed and provides adequate radial distribution of gas and liquid by forming concentric alternate rings of gas and liquid (5) substantial differences were shown where bed ebulation (expansion) occurred with one catalyst as compared to no significant bed ebulation (expansion) with another catalyst using the same size and shape but with a lower density, and (6) transfer of catalyst into, and out of, a bed travelling downwardly by gravity in a reactor vessel while continuously operating a hydroprocessing system to react a gas containing hydrogen and a feed stream of hydrocarbon liquids flowing as a single stream from the bottom of the bed, will permit countercurrent flow without separation during upward passage through and out of the top of the reactor vessel, and (7) as the result of intermittent catalyst discharge, the catalyst bed moves countercurrently down through the reactor in plug-like flow.

EXAMPLE II

From the foregoing tests in an apparatus under flow conditions described in Example I, the effectiveness of the foregoing mechanical and hydraulic factors were validated for performing hydrotreating processing with hydrocarbon and hydrogen streams counterflowing through a moving bed of catalyst particles, as follows:

In a pilot plant operating at up to 4 BPD hydrocarbon feed and hydrogen at 2200 PSI, catalyst bed expansion measurements were made at commercial-scale flow velocities with beds of catalysts of different sizes, shapes, and densities as indicated in Table I. Each type of catalyst was tested separately. Bed ebulation (expansion) was measured using a gamma-ray source and detector means mounted to detect 10% bed expansion. Table I shows flow velocities required to produce 10% bed expansion with several catalysts at a standard hydrogen recirculation rate of 5000 SCFB. These results confirmed the bed expansion results from the semi-commercial scale plant of Example I.

Table II is a similar set of runs using beds of three of the same catalyst particles as those tested under conditions shown in Table I except that the liquid viscosity, liquid density and pressure of the hydrocarbon feed stream and gas were lower in Table II than Table I to match a different set of commercial operating conditions. From Tables I and II the effect of catalyst particle size, density and shape are clearly indicated for different flow conditions for the liquid and gas components of the feed. The design feed rates for a hydrocarbon treating process were calculated by standard scaling procedures to indicate the values in MBPD (thousands of barrels per day) through a reactor vessel containing a catalyst bed 11.5 feet in diameter.

In general catalyst for commercial use would be selected on the basis of levitation or ebulation at a selected rate which is substantially higher than normal design feed rate, say up to 100% greater. Additionally, these tests indicate that some commercial catalysts will not lift at reasonable design feed rates if the particles have a high degree of uniformity and are sufficiently strong to maintain their integrity during movement into and out of the reactor vessel, without attrition or breakage.

V-shaped sheds was shown to be surprisingly effective even when gas was intentionally maldistributed below the redistributor stages.

SUMMARY

Briefly, these test results show that the present invention makes possible substantially continuous flow of uniformly distributed hydrogen and hydrocarbon liquid across a densely packed catalyst bed to fill substantially the entire volume of a reactor vessel by introducing the fluids as alternate annular rings of gas and liquid at a rate insufficient to levitate the bed and with the catalyst selected with a density, shape and size adequate to prevent lifting of the bed at the desired feed rates. (Catalysts are selected by measuring bed expansion in a large pilot plant run with hydrocarbon, hydrogen, and catalyst at the design pressures and flow velocities.) At the desired flow rate, such catalyst continually flows in a plug-like manner downwardly through the vessel by introducing fresh catalyst at the top of the bed by laminarly flowing such catalyst in a liquid stream on a periodic or semicontinuous basis. Catalyst is removed by laminarly flowing catalyst particles in a liquid stream out of the bottom of the bed. Intake for such flow is out of direct contact with the stream of gas flowing through

TABLE I

CATALYST BED EXPANSION STUDY TEST RESULTS
2200 PSI Hydrogen and Flush Oil
Liquid Density 51 lb/ft3 Viscosity 1.1 cp
Gas Density 0.49 lb/ft3 Viscosity 0.016 cp

| Catalyst | Relative Size | Shape | Skeletal Density | Particle Density | Effective Density In Oil (1) | Liquid Velocity Ft/Min | Gas Velocity Ft/Sec | MBPD in 11.5 ft. ID Reactor |
|---|---|---|---|---|---|---|---|---|
| A | 1 | Cylinder | 2.69 | 1.05 | 0.55 | 0.46 | 0.11 | 13 |
| B | 1.6 | Quadralobe | 3.55 | 1.03 | 0.56 | 0.60 | 0.14 | 17 |
| C | 2 | Cylinder | 3.61 | 1.60 | 1.05 | 0.46 | 0.11 | 13 |
| D | 3.2 | Sphere | 2.33 | 0.60 | 0.21 | 0.32 | 0.07 | 9 |
| E | 3.2 | Sphere | 3.63 | 0.83 | 0.47 | 1.38 | 0.33 | 40 |
| F | 3.2 | Cylinder | 3.58 | 1.37 | 0.89 | 1.38 | 0.33 | 40 |

(1) Effective Density in Oil = Density of the Particle in Oil with Buoyancy Forces Includes = (Skeletal Density) (vol % Skeleton) + (Oil Density) (vol % Pores) − Oil Density

TABLE II

CATALYST BED EXPANSION STUDY TEST RESULTS
With Hydrogen and Hydrocarbon at 1000 PSI
Liquid Density 48 lb/ft3 Viscosity 0.56 cp
Gas Density 0.23 lb/ft3 Viscosity 0.013. cp

| Catalyst | Relative Size | Shape | Skeletal Density | Particle Density | Effective Density In Oil | Liquid Velocity Ft/Min | Gas Velocity Ft/Sec | MBPD in 11.5 Ft. ID Reactor |
|---|---|---|---|---|---|---|---|---|
| C | 2 | Cylinder | 3.61 | 1.60 | | 0.53 | 0.13 | 15 |
| E | 3.2 | Sphere | 3.63 | 0.83 | | 1.38 | 0.33 | 40 |
| F | 3.2 | Cylinder | 3.58 | 1.37 | | 1.50 | 0.50 | 60 |

EXAMPLE III

In a 4 foot diameter vessel a "cold model" was operated using up to 8000 BPD water and 275 SCFM air. The features of the inlet liquid and gas distributor as well as the hydrogen gas redistribution and quench stages, described above and shown in the drawings were scaled and tested. Flow measurements and underwater photography proved that distribution of the inlet gas and liquid was uniform across the full cross-sectional area of the catalyst support screen in the vessel. Redistribution of the rising gas through the inverted the bed and the flow path is substantially constant in cross-sectional area and greater in diameter by several times than the diameter of the catalyst particles.

Various modifications and changes in the structural arrangement and in the steps set forth for on-stream catalyst replacement to take the greatest economic advantage of the hydroprocessing vessel capacity will occur to those skilled in the art. All such modifications or charges coming within the scope of the appended claims are intended to be included therein.

We claim:

1. Apparatus for controlling the uniformity of a combined stream of gas and liquid hydrocarbon components in a mixed feed stream for simultaneous upward flow thereof through a substantially packed catalyst bed flowing downwardly in a reactor vessel which comprises a generally cylindrical reactor vessel having means for introducing a mixed feed stream of gas and liquid hydrocarbon components into a lower end of said vessel, and means for supporting a bed of catalyst extending upwardly from said lower end of said vessel, said catalyst bed support means including a generally truncated conical member diverging upwardly from its apex and having a fluid pervious conical screen portion truncated at said apex by a fluid impervious central portion, said catalyst bed support means and the lower end of said reactor vessel forming a fluid reservoir which includes a generally horizontal wall means extending across said vessel and dividing said reservoir into a lower surge chamber and an upper plenum chamber, said wall means including a multiplicity of tubes forming the only fluid passageways therethrough, said tubes being substantially equally spaced from each other around said wall means, said tubes extending downwardly from said wall means to a depth in said surge chamber sufficient to form a multiplicity of fluid flow paths only from the lower end of said surge chamber for flow into said plenum chamber so as to prevent entry of gas components into said plenum chamber, except as components of a mixed feed stream, said plenum chamber including a plurality of concentric and generally cylindrical baffle members extending vertically upward in said chamber, an upper end of each of said baffle members abutting the lower surface of said screen member, said cylindrical baffle members being radially spaced apart from each other across the diameter of said cylindrical reactor vessel to form with said screen member a plurality of concentric reservoir rings to minimize separation of the gas and liquid components from said mixed feed stream prior to direct contact with the lower surface of said screen member, each of said generally cylindrical baffle members being generally coaxial with said vessel, and having substantially equal vertical lengths so that a lower end of each baffle member is at a depth below said upper end of the radially adjacent inward baffle member and below said lower end of the radially adjacent outward baffle member to divide said mixed feed stream into a plurality of concentric reservoir rings to prevent separation of said gas and liquid components of said mixed feed stream by forming multiple alternate gas and liquid flow rings through said conical screen member and into a catalyst bed to be supported thereon.

2. Apparatus in accordance with 1 wherein said bed support includes a plurality of circumferentially spaced-apart radial baffle members extending radially inward from the outer perimeter of said screen member toward said impervious central portion of said screen member to support said plurality of concentric baffle members against the lower surface of said conical screen member.

3. Apparatus in accordance with claim 2 wherein said bed support means is shaped as a truncated polygonal pyramid and each of said generally cylindrical baffle members comprises a plurality of segments, each segment being parallel to one of the sides of said polygonal pyramid and its abutting upper ends corresponding to the intersecting corners at adjacent sides of the polygon forming said concentric baffle members.

4. Apparatus in accordance with claim 2 wherein said conical screen member is shaped as a truncated cone and includes a plurality of cylindrical baffle members substantially equally spaced apart radially under said pervious screen member.

5. Apparatus in accordance with claim 1 which additionally includes means for extracting catalyst particles from the lower end of said reactor bed without additional expansion of said bed above said conical screen member, said means including at least one external pressure vessel and pipe means extending from said external pressure vessel into said reactor vessel, said means having an inlet opening directly above and adjacent to said impervious truncated central portion of said bed support means, said pipe means having a substantially uniform diameter from said inlet to said external pressure vessel and including at least one ball valve having a bore diameter not substantially less than the uniform diameter of said pipe means, means for controlling the pressure in said pipe means between said reactor vessel and said external pressure vessel when said ball valve is open for flow to induce uniform laminar flow of liquid from said reactor vessel to said external pressure vessel at a rate sufficient to displace catalyst particles from the volume of said catalyst bed directly adjacent and above said impervious central portion of said bed support.

6. Apparatus in accordance with claim 5 wherein said uniform diameter pipe means includes a J-tube extending through and above said truncated conical bed support screen means to dispose the inlet to said J-tube downwardly and directly over said impervious central portion of said catalyst bed support means.

7. Apparatus in accordance with claim 5 wherein said inlet of said pipe means is generally parallel and adjacent to the upper surface of said impervious central portion of said catalyst bed support means.

8. Apparatus in accordance with claim 5 wherein said pressure control means includes means for modifying the pressure of said external pressure vessel to initiate and stop flow of fluid between said reactor vessel and said external pressure vessel when said bore of said ball valve is open.

9. Apparatus in accordance with claim 5 wherein said pipe means includes at least one additional pipe means connected thereto for introducing an auxiliary fluid into said pipe means between said reactor vessel and said ball valve.

10. Apparatus in accordance with claim 9 wherein said additional pipe means includes auxiliary valve means for independently controlling fluid flow from an external source to selectively clear catalyst particles from said bore of said ball valve before closure thereof or to permit maintenance of a back flow of fluid into said vessels through said inlet of said pipe means between periodic withdrawals of catalyst entrained in fluid withdrawn from said reactor vessel through said pipe means.

11. In a countercurrent flow reactor vessel wherein a fluid mixture of a hydrocarbon liquid and a reactive gas are mixed in a reservoir formed in the lower end of said vessel for simultaneous flow upwardly through a bed of particles extending upwardly through said reactor vessel, and said particles are at least periodically added at the upper end of said vessel and removed from the lower end of said bed after said particles counterflow downwardly through said upwardly flowing stream of said fluid mixture, said particle bed extending upwardly from a pervious conical support means, and said fluid mixture enters the lower end of said bed from a reservoir at the lower end of said reactor vessel through said pervious conical support means, the improvement wherein, said particle bed support means comprises a truncated conical screen member extending and diverging upwardly and outwardly from the lower end of said reactor vessel to support said particle bed across substantially the full diameter of said reactor vessel, said conical portion of said screen member being uniformly pervious for fluid flow therethrough and the truncated central apex portion thereof being impervious to such fluid flow, and the lower pervious conical surface of said screen member abutting the upper ends of a plurality of concentric annular baffle members supported at the lower end of said reactor vessel, said baffle members extending downwardly from said screen member to form a plurality of substantially concentric annular passageways from said impervious truncated central portion of said bed support means to the cylindrical sidewall forming said reactor vessel said concentric annular passageways providing a direct flow path across the diameter of said reactor vessel for a fluid mixture of reactive gas and hydrocarbon liquid flowing from a reservoir formed between the lower end of said reactor vessel and the lower surface of said screen member, said reservoir further including a generally horizontal wall means extending across said reactor vessel at a level between a lower end wall of said vessel and said screen member to divide the volume of said reservoir into a lower surge chamber for receiving said gas and liquid mixture entering said reactor vessel and a separate upper plenum chamber, said wall means including a plurality of tubes substantially equally spaced apart from each other and extending radially and circumferentially over the surface of said wall means, said tubes extending downwardly from said wall means to a sufficient depth in said surge chamber to assure that the gas component of said mixed feed stream normally flows only with the hydrocarbon liquid component to enter said plenum chamber from said surge chamber through said tube means, and said concentric baffle members being radially spaced apart from each other at a distance to prevent excessive separation of gas from the liquid components of said fluid mixture prior to form a plurality of separate concentric annular fluid feed means under said conical portion of said screen member, each of said annular fluid feed means being formed by adjacent pairs of said baffle members extending axially downward into said plenum chamber from said pervious conical screen member to a depth sufficient to form said separate annular gas and liquid channels adjacent the abutment of the upper ends of said baffle members with the lower surface of said pervious conical portion of said screen member, and the lower end of each of said baffle members having an axial depth in said plenum chamber intermediate the axial depths of the immediately adjacent concentric baffle members in said plenum chamber so that said mixed fluid is free to separate simultaneously into alternate concentric bands of gas and liquid between each pair of adjacent baffle members for parallel flow into the full diameter and circumference of said screen member, except through said truncated impervious portion thereof.

12. In an apparatus in accordance with claim 11, wherein particles forming said bed are added to said bed at the upper end of said reactor vessel and removed from the center of the lower end of said bed said apparatus further including the improvement wherein said particles are transported into said reactor vessel by at least one flow line extending into said reactor vessel at a level above the upper end of said axially extending particle bed and particles are transferred out of the lower end of said reactor vessel by another flow line having an outlet at a level directly adjacent and over said truncated impervious central portion of said bed support, each of said flow lines having a substantially uniform diameter extending throughout its length from said reactor vessel to at least one external pressure vessel, each of said lines including at least one ball valve having a through bore not smaller than its respective flow lines and each of said flow lines being directly connected respectively to at least one pressure vessel for supplying fresh particles to the top of the said bed and for receiving spent particles removed from the bottom of said bed, and means for independently controlling the pressures of said external pressure vessel to regulate the flow rate of fluid through said lines to induce laminar flow of liquid through said flow lines to transport particles into and out of said reactor vessel without modification of flow of the components of said fluid mixture in said vessel over the axial length of said bed.

13. Apparatus for controlling the uniformity of flow of gas and liquid hydrocarbon components of a mixed feed stream thereof into a substantially packed catalyst bed in a reactor vessel for upward flow therethrough which comprises a generally cylindrical reactor vessel having means adjacent a lower end of said vessel for supporting a bed of catalyst extending axially upward through said reactor vessel, a generally conical catalyst bed support means, said bed support means including a fluid pervious conical screen member having its apex truncated by a fluid impervious central member, a plurality of concentric and generally cylindrical baffle members extending vertically below said screen member and radially spaced apart from each other across the diameter of said cylindrical reactor vessel to form a plurality of concentric reservoir rings for simultaneous flow of the gas and liquid components of a mixed phase feed stream into a catalyst bed to be supported on said conical screen member, each of said generally cylindrical baffle members being generally coaxial with said vessel, and each of said baffle members having an upper end abutting the lower surface of said conical screen member and having a substantially equal vertical length so that a lower end of each baffle member is at a depth below the upper end of the radially adjacent inward baffle member and below the lower end of the radially adjacent outward baffle member, said reactor vessel further including reservoir means for feeding a mixture of hydrocarbon fluids and reactant gas components into a reservoir formed between the lower end wall of said reactor vessel and said catalyst bed support means, said reservoir means including a generally horizontal wall means extending across said vessel at a level between said lower end wall of said vessel and said catalyst bed support means to divide said reservoir means into a lower surge chamber for receiving a mixed fluid feed of a gas component and a liquid component entering said vessel and a separate upper plenum chamber for maintaining and distributing said mixed fluid feed to each of said concentric annular rings defined by said baffle means, said wall means including a multiplicity of tubes substantially equally spaced from each other and extending radially and circumferentially over the area of said wall means and beneath said pervious screen member, said tubes extending downwardly from said wall means into said surge chamber, the length of said tubes being substantially the same to prevent the gas components from establishing preferential gas passages from said surge chamber into said plenum chamber upon changes in the composition of said mixture or surges of gas and thereby assure that said gas enters said plenum chamber as a portion of said mixture for separation of said gas and liquid components only between adjacent baffle members forming said reservoir rings to maintain concentric alternate rings of gas and liquid flowing from said reservoir rings across the full area of a catalyst bed to be supported on said conical support means.

14. Apparatus in accordance with claim 13 wherein said reactor vessel includes means for modifying gas flow through said bed intermediate said particle bed support means and the top of said bed comprising shed means supported by said reactor vessel intermediate the axial length thereof and extending transverse to the axis of the particle bed formed therein, each shed means having at least one inverted V-shape gas channel means extending laterally across said bed so as to laterally and outwardly deflect particles flowing downwardly over the upper surface of said V-shaped gas channel means and to intercept gas flowing upwardly under the lower surface of said channel means for lateral dispersion thereof, and means for selectively introducing additional gas flow from an external source into said particle bed including tubing means extending between said external source and an outlet under said lower surface of said V-shaped gas channel means, with said V-shaped gas channel means being impervious to gas flow through a major portion of said upper and lower surfaces.

15. Apparatus in accordance with claim 14 wherein said shed means includes a plurality of elongated slots extending along and through the lower edges of said V-shaped gas channel means for distributing gas therefrom into said particle bed.

* * * * *